United States Patent [19]

Gastineau

[11] 3,937,873

[45] Feb. 10, 1976

[54] ENGRAVING MACHINES

[76] Inventor: Paul E. Gastineau, 24 rue Mansart, 22000, Saint-Brieuc, France

[22] Filed: Apr. 22, 1974

[21] Appl. No.: 463,064

[30] Foreign Application Priority Data

Apr. 25, 1973 France .............................. 73.14912

[52] U.S. Cl. .............................. 178/6.6 B; 346/77 R

[51] Int. Cl.[2] ........................ H04N 1/10; H04N 1/24

[58] Field of Search ........................ 178/6.6 B, 6.6 R; 346/77 R; 274/3

[56] References Cited

UNITED STATES PATENTS

| | | | |
|---|---|---|---|
| 2,575,546 | 11/1951 | Boyajean | 178/6.6 B |
| 2,788,255 | 4/1957 | Farber | 178/6.6 B |
| 2,880,270 | 3/1959 | Hell | 178/6.6 B |
| 2,881,246 | 4/1959 | Fairchild | 178/6.6 B |
| 3,022,373 | 2/1962 | Levine et al. | 178/6.6 B |

*Primary Examiner*—Stuart N. Hecker
*Attorney, Agent, or Firm*—Darby & Darby

[57] ABSTRACT

In an engraving machine for use in making watermarks in which a table, on which a plate to be engraved and a model are to be mounted, is reciprocable longitudinally by a first lead screw and an engraving head is carried by an arm and provided with a stylet movable in response to information provided by an optical reading head mounted on a carriage movable transversely by a second lead screw controlled by a ratchet means, the engraving head is mounted on a carriage independently of the reading head, which carriage is movable transversely by a third lead screw driven substantially in synchronism with and by the second lead screw through a gear train, the maximum amplitude of oscillation of the stylet is adjustable and of the order of 3 to 4 mm.

25 Claims, 13 Drawing Figures

ENGRAVING MACHINES

The present invention relates to improvements in engraving machines and methods of engraving.

The technique for manufacturing light-and-dark watermarked paper is still at present based on hand-production, by transparency in a plate with a beeswax base, of an engraving reproducing the selected model. "Reproduction" means that the depth variations of the engraving are such that by transparency the stereotype reproduces the image of the model.

This wax engraving, which is an extremely delicate operation, may require up to several months work of a highly specialised engraver in the case of highly complex sizes of the order of 15 × 20 cm. For a bank-note watermark, it generally requires two to four weeks.

This engraving is used to produce, by electroplating, the dies and counter-dies which are then used to press-form a bronze cloth. This bronze cloth is the screen on which stuff will be deposited and its conformation produces the differences in thickness in the paper which constitute the watermark.

Machines exist for automatically producing printing plates, in particular for making flat half-tone engravings.

One of these machines, shown diagrammatically in FIG. 1 of the accompanying drawings, comprises a frame (not shown) carrying a table 1 which is longitudinally movable under the influence of a lead screw 2 and a carriage 3 which is transversely movable under the influence of lead screw 4.

The carriage 3 carries an engraving head 5 carrying a stylet 7 and an optical analysis system 6 which controls the vertical oscillations and the engraving depth of the stylet while the table carries the model and the plate to be engraved. Progressively as the table and the carriage move, the optical system 6 effects spot-analysis of the model and the stylet 7 engraves the plate correspondingly.

The table 1 reciprocates longitudinally under the control of a reversing device with an electromagnetic clutch 11. In one direction, reading and engraving are carried out, while the stylet is raised for the return movement.

Return of the table also actuates an escapement electromagnet which, by means of ratchet wheels, releases the screw which controls the movement of the carriage and which is driven by a friction coupling for a distance corresponding to an advance of one tooth of the ratchet wheel in the case of half-tone engraving (two teeth for reverse engraving).

A known machine of this type permits automatic manufacture of half-tone plates for printing, the engraved depth of which is not in excess of 0.2 mm, the screen of which is of the order of 25 to 50 lines per centimeter and which are identical symmetrical reproductions of the model.

To prepare an engraving for forming watermarks, it is also necessary to work flat, but with a much greater engraving depth, up to 3.5 mm, a much finer screen and reproduction optionally with or without symmetry and distortion relative to the model so as to automatically compensate for the distortion to which the paper is subject on the paper-making machine.

In accordance with one aspect of the invention there is provided a method of automatically forming watermark engravings, in which a photoelectric reading head is coupled with an engraving head provided with an oscillating stylet which are both moved with a longitudinal scanning motion combined with an intermittent transverse motion relative to a model and a plate to be engraved which are in fixed relative position, wherein the maximum amplitude of oscillation of the stylet is of the order of 3 to 4 mm and engraving is effected in successive identical passes, the distance between the engraving head and the plate being decreased progressively in successive stages by a maximum depth of the order of 0.2 mm.

Preferably between each different depth stage at least one pass is effected with the engraving head and the reading head shifted laterally and in opposite directions by a distance equal to a submultiple of the transverse interval and the transverse interval of the engraving head differs from the transverse interval of the reading head by a percentage corresponding to the percentage of distortion of the engraving relative to the model which is required to be obtained.

In accordance with another aspect of the invention there is provided an engraving machine for use in the formation of watermarks comprising a frame carrying a movable table on which a plate to be engraved and a model are to be mounted, the table being reciprocatable longitudinally by a first lead screw, an engraving head carried by an arm and provided with a stylet which is movable to engrave in grooves in response to information received from an optical reading head mounted on a carriage movable transversely by a second lead screw whose movement is controlled by a ratchet means and occurs during each return movement of the table, wherein the engraving head is mounted on a carriage independent of that of the reading head and which is movable transversely by a third lead screw extending parallel to the second lead screw and driven substantially in synchronism with and by the second lead screw through a gear train, the engraving head being adapted to rest on a horizontal bar means through stop means which is adjustable by a micrometer screw, the maximum amplitude of vertical oscillations of the stylet being adjustable and may be 3 to 4 mm.

The operation of the preferred embodiment of machine in accordance with the invention is as follows.

With the plate to be engraved fixed on the table above the model (the back of which faces downwards), the height of the engraving head is adjusted so that the stylet just touches the plate with its lower point and the respective positions of the carriages of the reading and engraving heads is adjusted to that they approximately coincide with the axis of the model and the plate.

The stylet is lowered by a selected amount and the reading carriage is returned to its starting position, against a previously adjusted stop on the lead screw.

The machine is then started and successive engraving passes are made, the bottom point of the stylet being lowered after each pass by means of the micrometric screw.

An extremely precise, deep engraving is thus obtained, which is suitable for producing engravings for watermarks.

The lead screw of the engraving head carriage may have a thread equal but opposite to that of the reading head and its rotation is in the same direction. A non-symmetrical engraving identical to the model is therefore obtained.

The lead screw of the engraving carriage may be detachable and be replaced by a lead screw whose thread is opposite to that of the lead screw of the reading carriage. As a result, the machine may provide symmetrical engravings (printing of certain watermarks) in addition to non-symmetrical engravings (watermarks in general).

The transmission of the rotary drive of the lead screws preferably includes speed varying means whose ratio varies at least from 1 to 7 and preferably from 1 to 10.

In fact, deep engraving (watermark) requires speeds approximately 6 to 8 times lower than those acceptable for engraving printing plates. Therefore, with such a speed varying means, the same machine can be used under the most favourable conditions both for half-tone engraving and for watermark engraving or for ancillary operations such as planing a watermark plate.

The gear wheels of the gear train carried by the second and third lead screws advantageously have a number of teeth which is an approximate whole number multiple of that of the ratchet wheel and means are provided to enable these gear wheels to be disengaged from each other. The reading arm is preferably mounted on the nut of the reading lead screw with play in a direction parallel to the axis of the lead screw, means being provided for locking the arm on the nut in a selected position. As a result, by shifting the gear-wheel on the engraving lead screw relative to the ratchet wheel and correspondingly adjusting the position of the reading head, the number of engraving and reading grooves per centimeter is multiplied by the same whole multiple. Thus, with a ratchet system with 26 teeth and a lead screw pitch of 5 mm, which gives a transverse advance interval of the stylet of 52 grooves per centimetre, if the teeth of the gear wheels of the two lead screws are 200 in number, or approximately 8 times more numerous than the ratchet teeth, by equal shifting of the lead screws in the same direction, intermediate passes may be effected giving a precision of up to 416 lines per centimeter (since approximately eight teeth of each of the gear wheels carried by the lead screws correspond to each tooth of the ratchet wheel).

The gear wheels carried by each of the lead screws may have an inequal number of teeth, the difference, related to the number of teeth on the gear wheel of the engraving lead screw, corresponding to the percentage of distortion of the engraving which is required to be obtained. Thus if it is desired to obtain an engraving distorted by 7% in the transverse direction, a gear wheel having 187 teeth will be placed on the engraving lead screw and one having 200 teeth on the reading lead screw. This will give a distortion of 13/187 or 6.95%. This enables engravings to be automatically produced which compensate in advance for distortions caused by the paper making machine and whose value is known.

A set of gear wheels is preferably kept in reserve corresponding to the distortions necessary for normal production.

The machine preferably includes means for mounting a rectangular frame and a model on the table with their edges parallel to the direction of movement of the table and of the engraving and reading heads, and a tool for forming a vertical cut adapted to be mounted on the engraving head to enable the edges of the engraving to be cut off using the longitudinal movement of the table and manual transverse displacement of the engraving heads.

In fact, plates for engraving were formerly fixed at 45° relative to the direction of movement of the table.

The above axial fixing, associated with cutting of the plate, permits the formation of watermarks of large size by juxtaposition of watermark elements of smaller size cut very precisely.

The plate to be engraved may be formed with a base of paraffin wax and pure carnauba wax with optional addition of colouring agent.

In fact, a zinc plate is not suitable for deep engraving, and the usual watermark engraving plate with a beeswax base is not suitable either, as the chips adhere to the stylet.

The above composition, preferably with 70% by weight of paraffin wax and 30% by weight of carnauba wax, has proved suitable. The additions of colouring agent depend on the colouring agent employed and correspond to a very small percentage relative to those above.

The machine may include means for cooling a plate by circulation of a fluid in the table.

In fact, the material of the plate may be of such a nature that the temperature variations will modify its physical characteristics and the proper execution of the engraving.

The machine may include means to cause automatic stoppage of the machine at the end of a pass.

The angle of cut of the cutting tool may be of the order of 10°, the lateral faces of the tool are inclined at approximately 5° to the vertical and the right section of the tool is trapezoidal, the sides of the trapezium being inclined at approximately 15° to the height.

The width of the end of the stylet is advantageously slightly greater than the distance separating two grooves. Thus, for a screen of 104 lines to the centimeter, it will advantageously be of the order of 0.11 to 0.13 mm.

The invention will be more fully understood from the following description of an embodiment thereof, given by way of example only, with reference to the accompanying drawings, in which.

Figure 2:
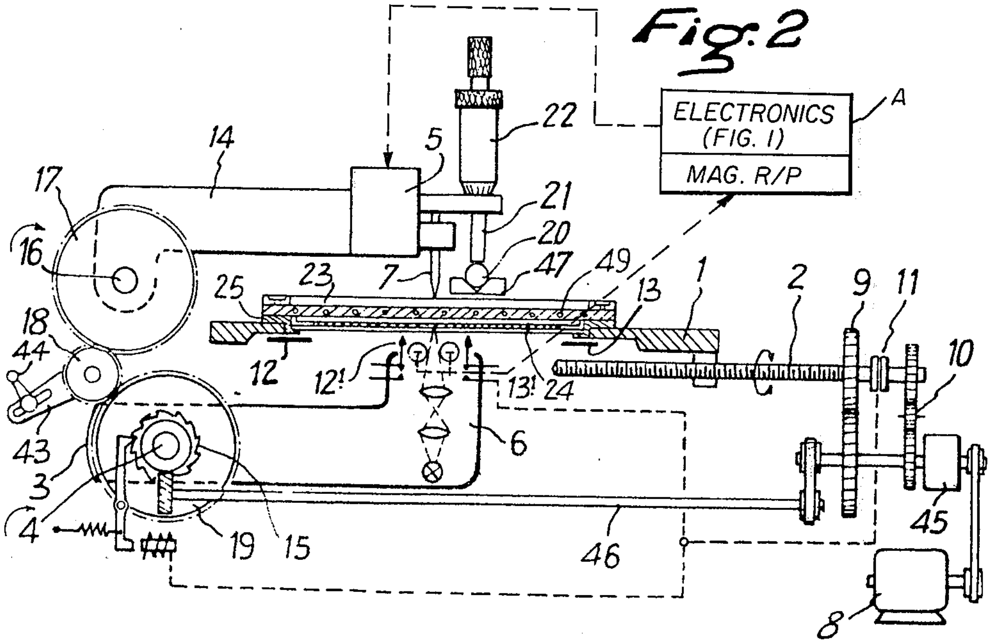
FIG. 2 is a side view partly in section of an embodiment of a machine in accordance with the invention (frame not shown)

The machine illustrated in FIG. 2 and the subsequent Figures is designed for use both for effecting half-tone engravings on zinc for printing and watermark engravings by removal or replacement of certain parts.

However, the description will essentially be limited to the features of the machine which are common to these two applications and to the features of the machine for watermark engravings.

As shown in FIG. 2, the machine comprises (as the known machine of FIG. 1) a frame (not shown) bearing a motor 8 driving, through gears 9 and 10 and reversing clutch 11, lead screw 2 which reciprocates the table 1 longitudinally backwards and forwards. Terminal stops 12 and 13 cause reversal of movement of table 1 by the action of contactors 12[1] and 13[1] on the reversing means of electromagnetic clutch 11.

Also in known manner, the machine has an engraving head 5 carried by an arm 14 and a reading head 6 mounted on a carriage 3, moved transversely by a second lead screw 4, which rotates under the control of ratchet wheel 15 during the return motion of the table 1, via a friction coupling (this mechanism is known and is not shown in detail in FIG. 2; in reality it is more complex and comprises two opposed ratchets).

A plate 23 to be engraved and model 24 are fixed one above the other in frame 25.

In a typical preferred embodiment, the plate is formed with a base of paraffin wax and carnauba wax, preferably pure. A coloring agent may be added, if desired. The preferred composition is 70% by weight of paraffin wax and 30% by weight of carnauba wax. The coloring agent, if used, comprises a small percentage of the total composition.

The plate and the model could alternatively be positioned side by side instead of one above the other as shown. In this case the reading and engraving heads are carried by arms situated on the same side of the table.

The engraving head 5 carries a stylet 7 which it reciprocates vertically in a manner to permit, as required, spot engraving (half-tone) or groove engraving (reverse engraving). The chips are sucked up by an appropriate system (not shown).

All these points are known and have not been described in detail.

In the preferred embodiment in accordance with the invention, the engraving head 5 and the arm 14 form a carriage independent of the carriage 3 and are mounted, by a suitable nut, on a third lead screw 16 supported by the frame, extending parallel to the lead screw 4 and driven in synchronism (or in a precise gear ratio close to synchronism) with the lead screw 4 through the gear train 17, 18 and 19.

The pitch of the lead screw 16 should be precisely equal to that of the lead screw 4, for example with a tolerance of 3/100 per 300 mm. The same is true for the gear ratio between the lead screws and consequently the precision with which the gears 17, 18 and 19 are cut should also be as high as possible. The lead screw nut is preferably made in two parts, one of which is sliding and separated from the first by a spring, so that there can be no play in the nut. Any other equivalent means for taking up play may be adopted.

Figure 1:
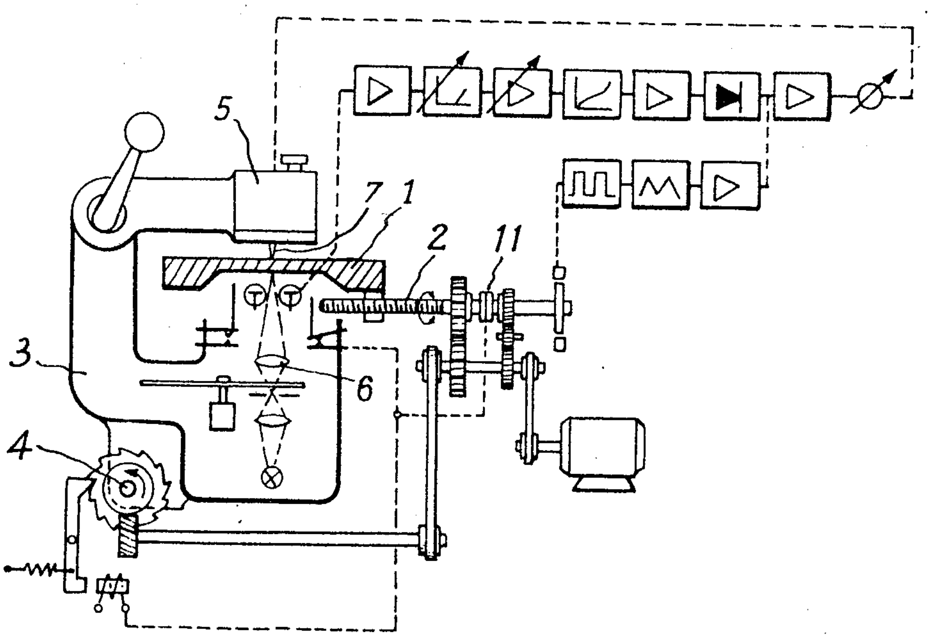
Fig:1 PRIOR ART
FIG. 1 is a side view partly in section of a known machine designed for the manufacture of half-tone printing plates.

This arrangement of the engraving head enables identical engravings to be produced, using a lead screw 16 with an opposite thread to that of the lead screw 4; the machine of FIG. 1 can in fact only produce symmetrical engravings, which is suitable for the production of a printing plate, but not for watermark engravings. By changing the lead screw, the machine of FIG. 2 can also produce symmetrical engravings.

When the plate and the model are positioned side by side, the threads of the two lead screws are not opposed for production of identical engravings.

As the arm 14 is pivoted on the lead screw 16, the engraving head 5 can be maintained at a predetermined height above the table 1 by means of a stop 21 which bears on a crossbar 20, the stop 21 being adjustable by means of micrometric screw 22. The bar 20 is preferably detachable and simply laid on V-blocks 47 fixed on the frame of the machine.

Figure 3:
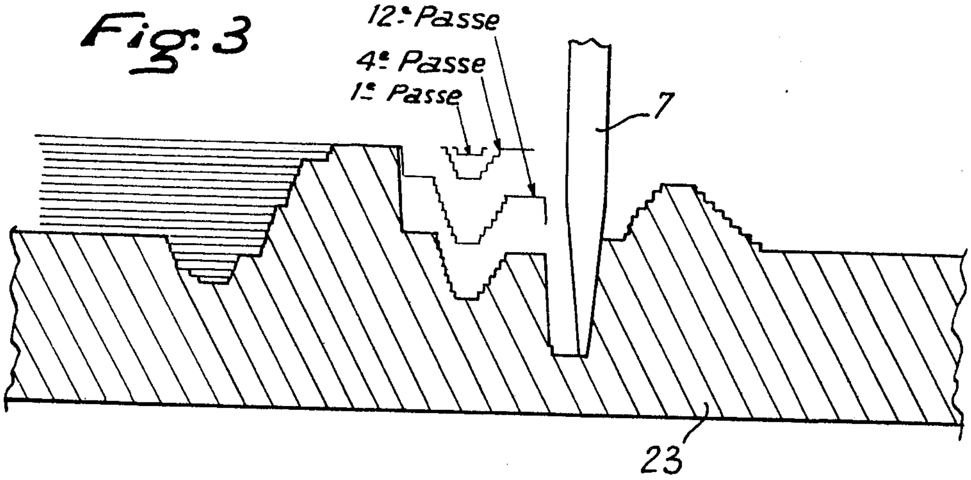
FIG. 3 is a section of a plate during engraving.

Thus not only do the vertical oscillations of the stylet 7 remain within a well-defined height zone over the plate, but it is also possible to form the engraving in several passes, lowering the lower level of the oscillations of the stylet at each pass by an amount determined by the screw 22, which permits deep engraving. In practice, for example passes of 0.2 mm will generally be adopted, and then passes of 0.05 mm for finishing. FIG. 3 illustrates this working in successive passes.

To start, the plate is planed by means of a special stylet, so as to obtain a plate thickness corresponding exactly to the selected engraving depth: to have good visual control by transparency, a depth of the order of 0.3 mm is in fact necessary between the bottom of the plate and the deepest zone of the engraving.

Figure 4:
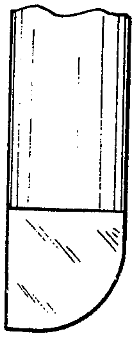
FIGS. 4 & 5 are side and front views of the end of a planing stylet.
Figure 5:
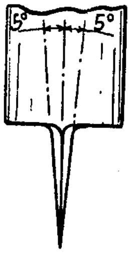

The planing stylet used is shown in FIGS. 4 and 5 and is mounted in a ferrule 48 (FIG. 12) which has a fixed mounting (after withdrawing the engraving stylet).

For planing the speed may be approximately five times greater than for engraving and the transverse intervals between passes of the stylet could be greater, for example 26 grooves per centimeter.

Planing completed, the engraving stylet 7 (FIGS. 6, 7 and 8) is placed in position and the micrometric screw 22 is so adjusted so that the lower level of the oscillations of the stylet just comes level with the plate. The engraving head is then lowered 0.2 mm for the first pass, etc.

Figure 6:
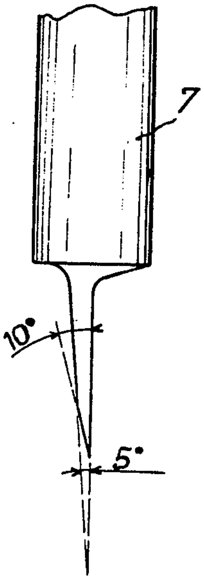
FIGS. 6, 7 & 8 show a front view, a side view and a section of the end of an engraving stylet.
Figure 7:
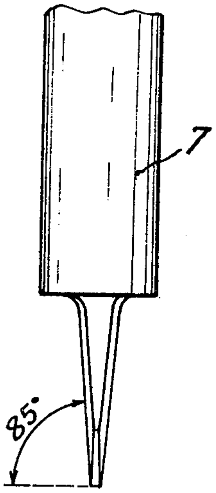
Figure 8:
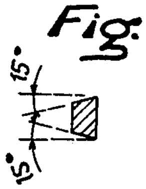

FIGS. 6, 7 and 8 respectively show front, side and section views of the end of the preferred form of engraving stylet. As shown, the cutting angle of the stylet is approximately 10° and its lateral faces are inclined at 5° to the vertical. The right section of the stylet, as shown in FIG. 8, is trapezoidal with the sides of the trapezium being inclined at approximately 15°.

The width of the end of the stylet is preferably made slightly greater than the distance separating two grooves. Thus, for example, for a screen of 104 lines to the centimeter, the width is preferably made in the order of 0.11 to 0.13 mm.

The automatic end-of-pass stop is not shown in the attached drawings. It may consist of a microswitch attached to the frame of the machine and operated by the end of an adjustable rod carried by the reading arm 3.

The engraving head 5 is so arranged as to permit a vertical oscillation amplitude of the stylet 7 of the order of 3 to 4 mm.

Such a head is known per se and it is sufficient for it to be of such a size as to obtain the required amplitude of oscillation. The control means could be purely mechanical, electromagnetic, electronic, etc. For example, the signals picked up by the photoelectric cells of the reading head could be transmitted to the stylet by means of electronic circuit means shown by block A in FIG. 2 having the usual components referred to in FIG. 1 such as amplifying means, and which may or may not include recording of the signals on magnetic tape and a magnetic reading means for transmitting the recorded signals to the engraving head. The latter are designated MAG R/P in block A. In particular, this enables the size of the engraving to be changed, as required, by modifying the playing speed of the tape relative to the translation speeds of the table and the engraving head.

Figure 9:
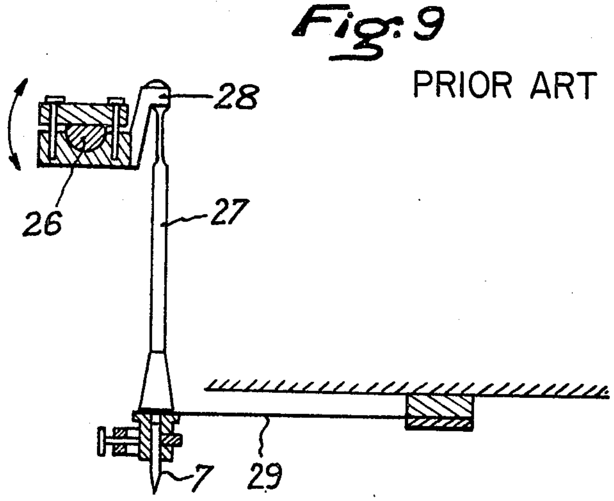
Fig. 9 PRIOR ART
FIG. 9 shows the known mounting arrangement for the stylet on the engraving head.
Figure 10:
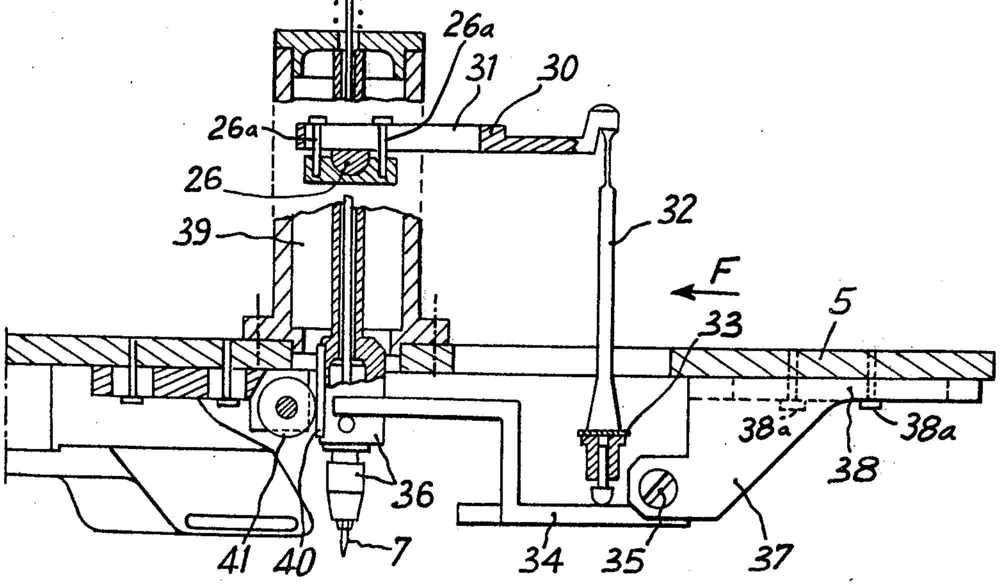
FIG. 10 shows the preferred mounting of the stylet on the engraving head.

A head may alternatively be provided which is capable of providing, as required, either amplitudes of 0.2 mm as is conventional, or amplitudes of the order of 3 to 4 mm, by interposition of detachable oscillating demultiplying arms as shown in FIGS. 9 and 10.

FIG. 9 shows the initial conventional mounting, which is suitable for half-tone work, formed of an oscillating shaft 26 which drives, through the rocker arm 28, a stylet holder 27 returned by spring 29.

FIG. 10 shows the mounting for watermark engraving, in which the shaft 26 drives a rocker arm 30, whose length is adjustable by means of fasteners 26*a* passing through an elongate opening 31 into the shaft bushing, and which acts on rod 32 retained and returned by a leaf type spring 33 (seen end-on in FIG. 10 but similar to the spring 29 of FIG. 9).

The rod 32 itself acts on lever arm 34 pivoted at 35 on support yoke 37 adjustably mounted on engraving head 5 by means of fasteners 38*a* passing through an aperture 38 into the engraving head and which oscillates the stylet holder spindle 36. The spindle is guided in its vertical oscillations by ball-bearing sleeve 39 with adjustable play and is returned by the spring 42; a means such as a small plate 40 co-operating with roller 41 prevents any rotation of the spindle 36 about its axis.

The adjustable length of the rocker arm 30 and the adjustable position of the yoke 37 permit adjustment of the oscillation stroke of the stylet 7 within a range of approximately 1 to 4 mm.

This mechanical assembly must be light (minimum inertia) and contain a minimum of ferrous metal to avoid the influence of magnetic fields of megnetized parts of the engraving head.

In FIG. 2 there is diagrammatically shown a conventional variable speed transmission 45 having a gear ratio of the order of 1 to 10. This enables high speed to be used for half-tone work, while a speed 6 to 8 times lower will be used for watermark engraving and planing can be effected at a speed similar to that used for half-tone work.

In the preferred embodiment in accordance with the invention, the ratchet device is arranged in combination with the pitches of the lead screws 4 and 16 so as to provide a screen at least equal to 50 lines per centimeter. In other words the number of teeth on the ratchet device divided by the pitch of the lead screws (in centimeters) is greater than or equal to approximately 50. If the lead screws have a pitch of 5 mm, a ratchet with at least 25 teeth will be required, the electric control being such that the ratchet device shifts by one tooth at each reciprocation of the table. This electric control is preferably arranged to also permit, as required, a shift of two teeth for each reciprocation of the table. This rate will be used for planing and half-tone work.

In the gear train 17, 18, 19, the gears 17 and 19 may be disconnected from each other, for example by mounting the gear wheel 18 on a sliding support 43 locked by lever 44 (FIG. 2). This permits initial adjustment of the respective positions of the reading head and the engraving head.

The lead screw 4 may be disconnected from the shaft 46 and driven manually. As the gear wheel 19 is keyed on the end of the lead screw 4 and the gear wheel 17 is keyed on the end of the lead screw 16, once these gear wheels have been disconnected, the lead screws 4 and 16 can operate manually, particularly so as to approximately superimpose the reading and engraving heads over the axis of the plate and the model.

With the gear wheels 17 and 19 reconnected, the arms of the reading and engraving heads are then moved simultaneously and manually to bring them into the initial engraving position, i.e. with the reading arm against a pre-adjusted stop on the lead screw 4.

Furthermore, as the gear wheels 17 and 19 have a number of teeth which is a multiple of the number of lines per centimetre, itself determined by the number of teeth on the ratchet wheel, this arrangement permits a considerable increase in the fineness of the engraving.

Thus, with a ratchet wheel having 26 positions per revolution of the lead screw 4 and a lead screw pitch of 5 mm, an engraving fineness of 52 lines per centimetre can be obtained.

As the gear wheels 17 and 19 each have 200 teeth, approximately eight teeth of each of these gear wheels correspond to each position of the ratchet wheel.

After a pass of 52 grooves per centimetre has been made, another pass may be made to the same depth after the gear wheel 17 driving the engraving head has been disconnected and shifted by four teeth. This causes a shift of the engraving head relative to its original position of approximately 0.1 mm. Provision is made for mounting the reading arm on the nut of the lead screw with a play of the same order, i.e. 0.1 mm, screws being provided to enable it to be locked in the selected position. By placing the reading arm in one end position for one pass and then in the other end position in the next pass, a shift can be obtained which can be equal to the width of the engraving head, care being taken that the shift directions correspond. Passes of 104 lines to the centimetre can thus be obtained.

It is possible to improve the system to obtain 208, and even 416, lines per centimetre, the position of the reading arm being exactly adjusted by means of a micrometric screw so as to obtain shifts equivalent to those which are obtained for the engraving arm.

While retaining the same pass depth, two passes are first made with gear wheel shifts of two teeth and six teeth, which gives 208 lines to the centimetre, and then four more passes with shifts of one, three, five and seven teeth. However, in the majority of cases, this precision is unnecessary.

Figure 13:
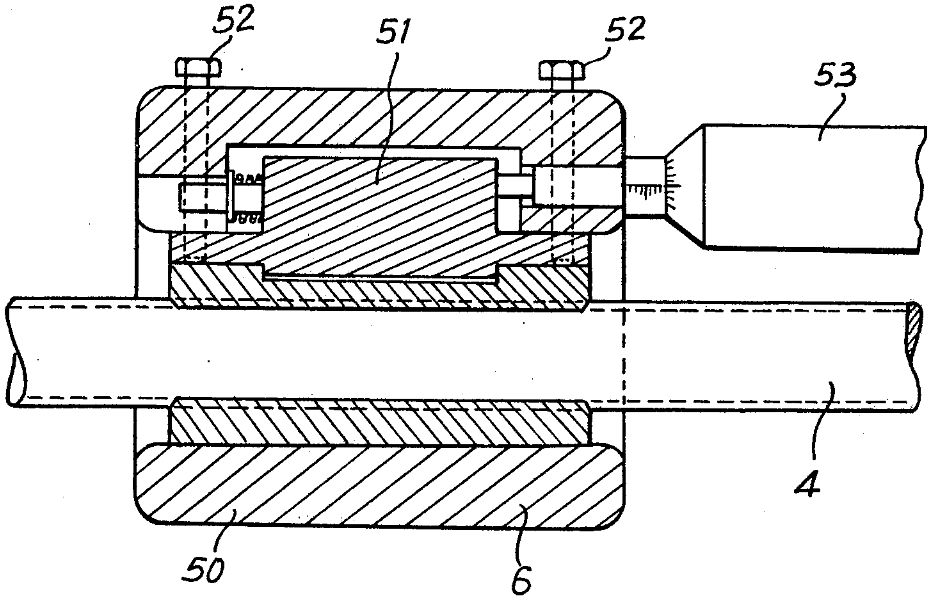
FIG. 13 shows a mounting for the reading head.

FIG. 13 shows the system for shifting the reading head. As shown, the reading lead screw 4 carries the reading arm 6 by means of nut 50. The reading arm 6 is fixed on the nut 50 with play by means of intermediate piece 51 and clamping screws 52. An optional micrometric screw 53 enables this fixing to be effected with the required precision in intermediate positions.

Lastly, the same arrangement of gear wheels 17, 18 and 19 permits solution of the problem of deliberate distortion of the engraving in order to compensate for distortions of the paper.

In fact the paper undergoes distortions during manufacture on the papermaking machine: elongation in the running direction of the machine and shrinkage in a direction transverse to the running direction.

The type die which is to be used for embossing the bronze cloths must therefore be distorted in the opposite direction, as must be the engraving which is used to form this die.

To take an example, it will be supposed that the paper intended for use on a predetermined machine undergoes a longitudinal elongation of +2.5% and a transverse shrinkage of −4.5%. The engraving must therefore have a longitudinal shrinkage of 2.5% and a transverse enlargement of +4.5%.

In the preferred embodiment in accordance with the invention, the model is firstly photographically reduced by −2.5% and it is the reduced model which is mounted on the machine. Shrinkage of −2.5% is thus automatically provided both longitudinally and transversally. In the transverse direction, an enlargement of 2.5% + 4.5% or 7% relative to the model is therefore necessary.

The gear wheel 17 of 200 teeth is replaced by a gear wheel of 187 teeth, the drive of the lead screw 16 by the lead screw 4 is not exactly synchronous, but close to synchronism, with an increase of 13/187 or 6.95%. Any transverse displacement of the reading carriage 3 will therefore cause a transverse displacement of the stylet 7 which is 6.95% greater. The engraving will therefore be automatically distored by approximately 7% in the required direction.

Advantageously, a set of gear wheels 17 will be provided having numbers of teeth corresponding to the distortions necessary for normal manufacture.

For the manufacture of half-tone plates, the frames carrying the plate and model are generally fixed at 45° to the direction of movement of the table.

In the embodiment of machine of the invention, the frames 25 are fixed with their edges parallel to the longitudinal and transverse lead screws.

Figure 11:
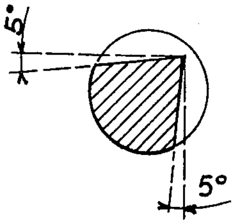
FIG. 11 shows the section of a cutter for cutting off the edges of the plates.
Figure 12:
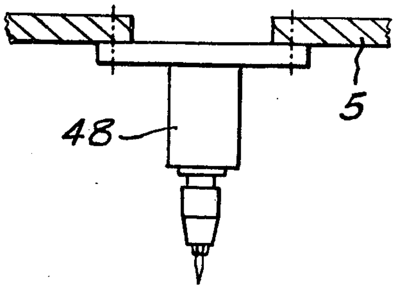
FIG 12 shows a mounting for the cutter or planning stylet.

This arrangement enables engravings of large size to be produced in elements which will be juxtaposed, these elements being cut off with extreme precision using the longitudinal movement of the table and the transverse manual movement of the engraving head, by means of a cutter shown in section in FIG. 11, this cutter being mounted in the ferrule 48 fixed in the engraving head (FIG. 12).

The engraving plate with approximately 70% of paraffin wax and 30% of carnauba wax is preferably obtained by casting between two silicone rubber plates and not in the open air, in order to obtain uniform cooling and avoid the problems of shrinkage.

As such plates are sensitive to temperature, they must be protected against heating due to the operation of the machine. To do this, a circulation of water 49 is established in the thickness of the frame 25 carrying the engraving plate, (FIG. 2) over the whole surface situated under the plate, the frame 25 being connected to a source of cooling water by flexible conduits (not shown). It is preferable to wait for the engraving plate to be cooled before finally locking it in the frame 25.

The advantages of the above-described machine are as follows.

Any engravings for watermarks, whatever they may be, can be produced on this machine, from watermarks for bank notes, share certificates, etc. to the very large artistic watermarks formed in hand-made paper.

The engravings can be of perfect regularity, fidelity and finish, reproducing the model in its least detail, whatever may be the depth of the engraving, which may be up to 3.5 mm (in the case of large hand-made watermarks).

The engravings may be distorted directly by the machine, in accordance with the required distortion percentages, so as to automatically compensate for the average distortion which the paper undergoes on the paper-making machine (by elongation in the direction of travel and shrinkage in the traverse direction).

The mechanical uniformity of the rake angles of the engraving and slight rounding of the angles is ideal for pressing out bronze cloths. The engraving obtained is such that it becomes possible to press very small details into the cloth.

The machine effects ideal automatic selection of over-fine and unnecessary details (details of hair or beards for example).

When a photographic model is not directly usable for the watermark, the plates engraved by the machine can be directly retouched by hand in the same way as hand-engravings on wax.

Practically all documents are usable directly, whether they are in black and white or in colour, photographs (gloss or matt), drawings, water-colours, printed documents or engravings (copper-plate or other processes).

The machine may also be used with a negative document (obtained with a reversal mirror) on bromide paper, in order to dispense with making another photographic print (loss of quality) in the case of a size change.

Even if a document seems to lack contrast, adjustment of the machine enables the scale of shades to be extended. It is possible to attain an engraving depth of 3.5 mm even if the darkest shade on the model is grey.

The saving in time is considerable.

It can take only about 10 hours to make a bank note watermark engraving (including distortion) whatever the watermark may be.

The machine requires 3 to 4 days to make an extremely complex engraving, e.g. of 150 mm × 195 mm, which would require a minimum of 3 to 4 months work to be made by hand on wax.

In addition to the substantial reduction in manufacturing times (and particularly times for examination of samples) new possibilities result from this to improve the security of fiduciary papers, as the manufacture of complex watermarks, of large area and maximum quality becomes financially feasible.

The manufacture of large, very complex, artistic or advertising watermarks also becomes possible.

The maximum size of the engravings is 150 mm ×195 mm, but the size of the watermarks is unlimited: it is easy to obtain larger watermarks by dividing the model, exactly juxtaposing the engravings obtained and taking a silicone rubber mould of the assembly.

It is possible to engrave several watermarks simultaneously on the same plate.

It will be appreciated that the above-described machine may be modified without departing from the scope of the invention as defined in the appendent claims hereinafter.

For example, it has been indicated that the lead screw 16 is of the same pitch as the lead screw 4 and driven by the latter with a gear ratio very close to unity. The lead screw 16 may be given a different pitch, the gear train which links them having a gear ratio very close to the reciprocal of the ratio of the pitches.

The machine described can be used both for half-tone work and for water-mark engraving. It will be necessary to compensate for the lesser thickness of half-tone plates and the difference in level of the half-tone (mounting FIG. 9) and watermark engraving (mounting FIG. 10) stylets by making provision to fix the half-tone plates on a plate of suitable thickness for the stylet to remain vertical.

The length of the longitudinal displacements of the engraving table is controlled by stops 12 and 13 operating push-button contactors $12^1$ and $13^1$ on the reading head. For large size watermarks, these stop plates are made fast with the table. For small watermarks (bank notes for example), it is advantageous to have smaller model-holding and engraving-holding frames (saving in time). These smaller model-holding frames will advantageously have closer stops, in order to limit the stroke of the table.

What is claimed is:

1. A method of automatically forming watermark engravings, in which an optical reading head is coupled with an engraving head provided with an oscillating stylet which are both moved with a longitudinal scanning motion combined with an intermittent transverse motion respectively relative to a model and a plate to be engraved which are in fixed relative position, wherein the maximum amplitude of oscillation of the stylet is of the order of 3 to 4 mm and engraving is effected in successive identical passes, the distance between the engraving head and the plate being decreased progressively in successive stages by a maximum depth of the order of 0.2 mm.

2. A method in accordance with claim 1, wherein between each different depth stage at least one pass is effected with the engraving head and the reading head shifted laterally and in opposite directions by a distance equal to a submultiple of the transverse interval.

3. A method in accordance with claim 1, wherein the transverse interval of the engraving head differs from the transverse interval of the reading head by a percentage corresponding to the percentage of distortion of the engraving relative to the model which is required to be obtained.

4. An engraving machine comprising a movable table for holding a plate to be engraved and a model from which the engraving is to be made, first lead screw means for reciprocating said table in a first direction, first carriage means, optical reading means carried by said carriage means, second lead screw means for moving said carriage means in a second direction generally transverse to said first direction to cause said optical reading means to scan the model and produce a signal in response to the information on the model, second carriage means, independently movable of said first carriage means, engraving means carried by said second carriage means, said engraving means including a stylet movable with respect to the plate to engrave grooves in the plate, means responsive to the signal produced by said optical means to control the movement of the engraving means with respect to the plate, third lead screw means extending generally parallel to said second lead screw means for moving said second carriage in said second direction, and means including gear means for driving said second and third lead screw means substantially in synchronism.

5. A machine as in claim 4 further comprising micrometer adjustable means for said engraving means limiting the depth of the grooves produced by the stylet to a maximum range of from about 3 to 4 mm.

6. A machine as in claim 4 wherein said gear means is disconnectable from between said second and third lead screw means.

7. A machine as in claim 4 wherein said second and third lead screw means have threads of opposite directions and substantially the same pitch, said drive means rotating said second and third lead screw means in the same direction.

8. A machine as in claim 4 wherein said second and third lead screw means have threads of opposite directions, and drive means rotating said second and third lead screw means in the same direction.

9. A machine as in claim 4 wherein said drive means includes means for varying the speed between the second and third lead screw means by a ratio in the range of about 10:1.

10. A machine as in claim 4 wherein said gear means includes gears having an unequal number of teeth to produce a given amount of difference in the movement between said first and second carriage means and an amount of distortion between the signal produced by said optical reading means and the grooves produced by said stylet.

11. A machine in accordance with claim 4 wherein information picked up from the model by the reading head is transmitted to the engraving means by means of electronic means, said electronic means including means for recording the signals on magnetic tape, and magnetic reading means for transmitting the signals to the engraving means.

12. A machine as in claim 4 wherein said engraving means includes a rocker arm of adjustable length acting on a rod, a lever arm actuated by said rocker arm, means for pivotally mounting said rod with an adjustable pivot point, said lever arm driving said stylet.

13. A machine in accordance with claim 4, including means for mounting a rectangular frame and a model on the table with their edges parallel to the directions of movement of the table and of the engraving and reading means, and a cutting tool adaptted to be mounted in a ferrule on the engraving means for enabling the edges of an engraving to be cut off using the longitudinal movement of the table and manual transverse displacement of the engraving means.

14. A machine as in claim 4 further comprising fluid circulating means for cooling the plate.

15. A machine in accordance with claim 4 wherein the width of the end of the stylet is slightly greater than the distance separating two grooves.

16. A machine as in claim 4 wherein said first carriage means carrying said optical reading means is mounted on a nut on said second lead screw means, said nut including means for allowing play in a direction parallel to the axis of said second lead screw means, and means for locking said first carriage means to the nut in a selected position.

17. A machine as in claim 16 wherein said locking means includes micrometer adjustment means.

18. A machine in accordance with claim 4 wherein the plate to be engraved is formed with a base of paraffin wax and pure carnauba.

19. A machine as in claim 18 wherein said base of the plate includes a coloring agent.

20. A machine in accordance with claim 18 wherein the plate is formed with a base of a mixture of approximately 70% of paraffin wax and approximately 30% of carnauba wax.

21. A machine as in claim 4 further comprising ratchet means operable in response to a return movement of the table for controlling the movement of said second lead screw means and said first carriage means.

22. A machine as in claim 21 wherein the ratchet means is constructed relative to the pitches of the second and third lead screw means to permit an advance of said second carriage means during a complete traversal of movement of the table in said first direction.

23. A machine as in claim 21 wherein said gear means has a number of teeth which is substantially a multiple of the number of teeth of said ratchet means.

24. A machine as in claim 23 wherein said gear means comprises a plurality of gears, and means for disengaging the gears.

25. A machine in accordance with claim 4 wherein the cutting angle of the stylet is in the order of 10°, the lateral faces of the tool at inclined at 5° to the vertical and the right section of the tool is trapezoidal, the sides of the trapezium being inclined at approximately 15° to the height.

* * * * *